United States Patent
Ebnother et al.

[15] 3,678,058
[45] July 18, 1972

[54] 1,3,4,9B-TETRAHYDRO-2(2H)-INDENO-[1,2-C]PYRIDINES

[72] Inventors: Anton Ebnother, Arlesheim; Jean-Michel Bastian, Birsfelden; Erwin Rissi, Basle, all of Switzerland

[73] Assignee: Sandoz Ltd., (a/k/a Sandoz AG), Basle, Switzerland

[22] Filed: April 30, 1970

[21] Appl. No.: 33,498

[30] Foreign Application Priority Data

May 7, 1969 Switzerland ............................ 6967/69
Dec. 11, 1969 Switzerland ........................ 18424/69
Feb. 5, 1970 Switzerland ............................ 1651/70

[52] U.S. Cl. ................ 260/293.54, 260/293.81, 260/295 R, 424/267
[51] Int. Cl. ........................................................ C07d 39/00
[58] Field of Search .......... 260/293 B, 294 D, 294 A, 294.3 E

[56] References Cited

UNITED STATES PATENTS 3,462,443  8/1969  Paragamian ........................... 260/294

Primary Examiner—Henry R. Jiles
Assistant Examiner—G. Thomas Todd
Attorney—Gerald D. Sharkin, Robert S. Honor, Frederick H. Weinfeldt, Richard E. Vila and Walter F. Jewell

[57] ABSTRACT

The invention concerns acid addition salts of novel indenopyridine derivatives of the formula:

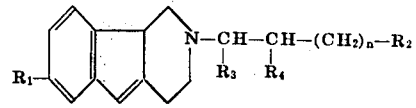

wherein $R_1$ is hydrogen, lower alkyl, fluorine, bromine or chlorine, $R_2$ is cyano, $COOR_5$ wherein $R_5$ is hydrogen or lower alkyl, or

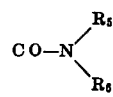

wherein $R_5$ is as above and $R_6$ is hydrogen or lower alkyl, or $R_5$ and $R_6$ together with the nitrogen atom form a heterocyclic ring system with a total of 5 to 7 ring members, $R_3$ and $R_4$ are hydrogen or lower alkyl, and $n$ is 0 to 3.

Processes for the production of the said compounds as well as intermediates therefor are described.

The compounds exhibit antiphlogistic, ulcer-protective, hypotensive and anorexigenic effects.

16 Claims, No Drawings

1,3,4,9B-TETRAHYDRO-2(2H)-INDENO-[1,2-C]PYRIDINES

The present invention relates to acid addition salts of new indenopyridine derivatives of formula I,

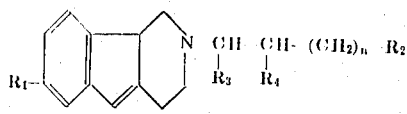

in which
R₁ signifies hydrogen, a lower alkyl radical, fluorine, bromine or chlorine,
R₂ signifies the cyano radical, a COOR₅ radical,
in which R₅ signifies hydrogen or a lower alkyl radical, or a

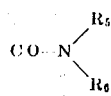

radical,
in which R₅ has the above significance, and R₆ signifies hydrogen or a lower alkyl radical, or
R₅ and R₆ together with the nitrogen atom form a heterocyclic ring system with a total of 5 to 7 ring members,
R₃ and R₄ signify hydrogen or a lower alkyl radical, and n signifies 0 to 3,
as well as processes for the production thereof.

The acid addition salts of the new indenopyridine derivatives of formula I are obtained in accordance with the invention by a. removing water from a compound of formula II,

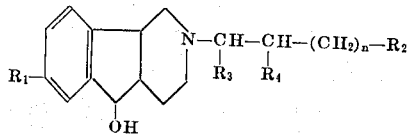

in which R₁, R₂, R₃, R₄ and n have the above significance, by treatment with a strong acid or the chloride, bromide or iodide of a strong acid, provided that when R₂ signifies COOH, a strong acid is employed for the removal of water, or b. removing water from a compound of formula IIa,

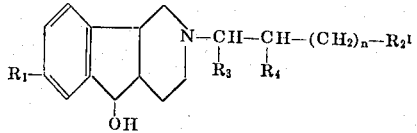

in which R₁, R₃, R₄ and n have the above significance, and R₂' signifies the cyano radical, a COOR₅' radical,
in which R₅' signifies a lower alkyl radical, or a

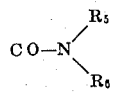

radical,
in which R₅ and R₆ have the above significance, by treatment with a strong acid or the chloride, bromide or iodide of a strong acid, and simultaneously or subsequently hydrolyzing the substituent R₂' to the carboxyl radical, to produce an acid addition salt of a compound of formula Ia,

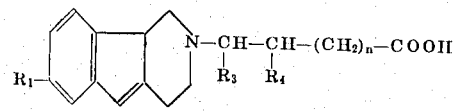

in which R₁, R₃, R₄ and n have the above significance, or c. removing water from a compound of formula IIb,

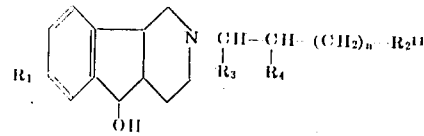

in which
R₁, R₃, R₄ and n have the above significance, and
R₂'' signifies the cyano or the carboxyl radical, or a

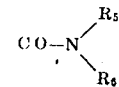

radical,
in which R₅ and R₆ have the above significance,
by treatment with a strong acid or the chloride, bromide or iodide of a strong acid, and esterifying simultaneously or subsequently, to produce an acid addition salt of a compound of formula Ib,

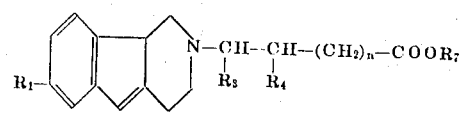

in which
R₁, R₃, R₄ and n have the above significance, and
R₇ signifies a lower alkyl radical.

The compounds of formula I are stable in the form of their acid addition salts. In the form of free bases, however, a rearrangement occurs with a shifting of the double bond from the 4a,5 to the 4a,9b position. Therefore, it is preferred to effect the removal of water with strong acids which give crystalline salts with the compounds of formula I, or with chlorides, bromides or iodides of strong acids, the reaction products of which formed during the removal of water give crystalline salts with the compounds of formula I.

Chlorides, bromides or iodides of strong acids may only be used for the removal of water when R₂ signifies other than the COOH radical, since in this case the carboxyl radical is converted to the corresponding acid halide radical.

Examples of suitable strong acids for the removal of water are mineral acids (e.g. in aqueous or alcoholic solution) such as hydrochloric, hydrobromic, hydriodic or sulphuric acid, or organic acids, e.g. organic sulphonic acids such as methanesulphonic acid, benzenesulphonic acid or naphthalene-1,5-disulphonic acid. Thionyl chloride may, for example, be used as halide of a strong acid.

Water removal is effected by treating the hydroxy compounds of formula II, as free bases or in form of their acid addition salts, e.g. as hydrochloride, during approximately one minute to 24 hours, preferably 15 minutes to 2 hours, at room temperature to the boiling temperature of the reaction mixture, optionally in a solvent which is inert under the reaction conditions, with strong acids or chlorides, bromides or iodides of strong acids. The reaction mixture is subsequently evaporated to dryness, and the resulting acid addition salts of the compounds of formula I are optionally purified in accordance with known methods.

During the removal of water the substituent on the nitrogen atom may remain unchanged or likewise participate in a reaction, depending on the chosen reaction conditions. Thus, for example, compounds of formula Ia may not only be obtained from compounds of formula IIc,

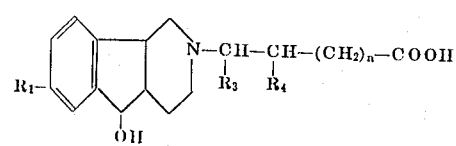

in which $R_1$, $R_3$, $R_4$ and n have the above significance, but also from compounds of formula IId, $$\text{R}_1\text{-}\underset{\text{OH}}{\underset{|}{\text{[fused ring]}}}\text{N-CH-CH-(CH}_2)_n\text{-COOR}_7 \atop \underset{R_3}{|} \underset{R_4}{|}$$

IId in which $R_1$, $R_3$, $R_4$, $R_7$ and n have the above significance, or from compounds of formulas IIe and IIf, $$\text{R}_1\text{-}\underset{\text{OH}}{\underset{|}{\text{[fused ring]}}}\text{N-CH-CH-(CH}_2)_n\text{-CO-NH}_2 \atop \underset{R_3}{|} \underset{R_4}{|}$$

IIe $$\text{R}_1\text{-}\underset{\text{OH}}{\underset{|}{\text{[fused ring]}}}\text{N-CH-CH-(CH}_2)_n\text{-CN} \atop \underset{R_3}{|} \underset{R_4}{|}$$

IIf in which $R_1$, $R_3$, $R_4$ and n have the above significance.

When it is desired to obtain compounds of formula Ib as final products, then the removal of water is effected with acids or chlorides, bromides or iodides of strong acids, preferably in the absence of water, e.g. in the corresponding anhydrous alcohol. In this case any amide or cyano group which may be present can first be hydrolyzed to the carboxyl radical and subsequently esterified. However, esterification of the amide, cyano or carboxyl radical may also be effected simultaneously with the removal of water.

The process of the invention may, for example, be effected as follows:

A hydroxy compound of formula II is heated to the boil under reflux for about half an hour with a strong acid or the chloride, bromide or iodide of a strong acid. The resulting acid addition salt of the compound of formula I usually already separates as a crystalline precipitate during heating or upon cooling the reaction mixture. If no precipitate results, the reaction solution is evaporated until crystallization commences or to dryness. The crude product can be purified in a conventional manner.

The lower alkyl radicals represented by the symbols $R_1$, $R_3$ and $R_4$ preferably contain one to four carbon atoms and especially signify the methyl radical. The alkyl radicals represented by the symbols $R_5$ and $R_6$ preferably contain one to six, especially one to three carbon atoms.

The starting materials of formula II are new and may be obtained by a'. reacting a compound of formula III, $$\text{R}_1\text{-}\underset{\text{OH}}{\underset{|}{\text{[fused ring]}}}\text{N-H}$$

III in which $R_1$ has the above significance, with a compound of formula IV, $$\text{Hal-CH-CH-(CH}_2)_n\text{-R}_2 \atop \underset{R_3}{|} \underset{R_4}{|}$$

IV in which $R_2$, $R_3$, $R_4$ and n have the above significance, and Hal signifies chlorine, bromine or iodine, in the presence of a basic condensation agent, or b'. reacting a compound of formula III with acrylic acid or with an acrylic acid derivative of formula V, $$\text{CH=C-R}_2 \atop \underset{R_3}{|} \underset{R_4}{|}$$

V in which $R_2$, $R_3$ and $R_4$ have the above significance, to produce compounds of formula IIg, $$\text{R}_1\text{-}\underset{\text{OH}}{\underset{|}{\text{[fused ring]}}}\text{N-CH-CH-R}_2 \atop \underset{R_3}{|} \underset{R_4}{|}$$

IIg in which $R_1$, $R_2$, $R_3$ and $R_4$ have the above significance.

Process (a') may, for example, be effected by reacting a compound of formula III in the presence of a basic condensation agent and in a solvent which is inert under the reaction conditions, e.g. a di(lower)alkyl-carboxylic acid amide such as dimethyl formamide, at an elevated temperature, e.g. 130°C, with a compound of formula IV, the reaction being complete after about 2 hours. An alkali metal carbonate such as sodium or potassium carbonate, or an excess of an equivalent of the compound of formula III may, for example, be used as basic condensation agent. The reaction product may be purified in accordance with known methods or may be worked up as such without further purification.

The reaction of a compound of formula III with a compound of formula V in accordance with process (b') may, for example, be effected at an elevated temperature, preferably at the boiling temperature of the reaction mixture under reflux, optionally in a solvent which is inert under the reaction conditions, e.g. a lower alcohol such as methanol or ethanol. The reaction has a duration of between about 2 and 16 hours. The resulting product may be isolated in accordance with known methods and purified, e.g. by crystallization, or may be worked up as such.

Some of the starting materials required for the production of compounds of formula II are known; they may be produced as follows:

Compounds of formula III may be produced by reacting a tetrahydroisonicotinic acid ester of formula VI, $$\text{Alkyl-OOC-}\underset{}{\text{[ring]}}\text{N-R}_8$$

VI in which $R_8$ signifies the methyl or benzyl radical, with a magnesium compound of formula VII, $$\text{R}_1\text{-}\underset{}{\text{[ring]}}\text{-MgBr}$$

VII in which $R_1$ has the above significance; hydrolysis of the resulting products yields compounds of formula VIII, $$\text{R}_1\text{-}\underset{}{\text{[ring]}}\text{-}\underset{}{\text{[ring]}}\text{N-R}_8 \atop \text{Alkyl-OOC}$$

VIII in which $R_1$ and $R_8$ have the above significance. These are converted into compounds of formula IX, $$\text{R}_1\text{-}\underset{\text{O}}{\underset{\|}{\text{[fused ring]}}}\text{N-R}_8$$

IX in which $R_1$ and $R_8$ have the above significance, either directly by heating with polyphosphoric acid, or by hydrolysis to the free carboxylic acids, production of the acid chloride, e.g. with thionyl chloride, and cyclization with Friedel-Crafts catalysts such as anhydrous aluminum chloride.

Compounds of formula X,

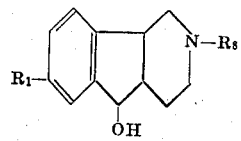

in which $R_1$ and $R_8$ have the above significance, may be obtained by selective reduction of the carbonyl radical of ketones of formula IX to the CHOH radical.

Compounds of formula III may be obtained in that the OH radical in a compound of formula X is protected by conversion into a readily cleavable ester or ether, the resulting compound is subsequently converted into the corresponding urethane by reaction with an ester of chloroformi acid, the protective radical is then removed from the urethane, and the urethane radical is subjected to alkaline hydrolysis, the removal of the protective radical taking place simultaneously or being effected subsequently.

Pharmacologically tolerable acid addition salts of the compounds of formula I are useful because they possess pharmacological activity in animals. In particular, the compounds are useful antiphlogistics, as indicated in the traumatic edema test in rats. Satisfactory results are generally obtained in test animals at doses between about 3 and 30 mg/kg of body weight. For larger mammals the daily dose indicated is between about 5 and 30 mg. For oral administration partial doses contain between about 2 and 15 mg of the acid addition salts of the compounds of formula I aside from solid or liquid carrier materials.

The compounds furthermore possess ulcer-protective properties, as shown by results obtained in the phenylbutazone ulcer test in rats. Satisfactory results are generally obtained in test animals at doses between 5 and 20 mg/kg of body weight. For larger mammals the daily dose indicated is between about 10 and 50 mg. For oral administration partial doses contain between about 3 and 25 mg of the acid addition salts of the compounds of formula I aside from solid or liquid carrier materials.

The compounds additionally exhibit a hypotensive effect as shown in blood circulation tests with narcotized dogs. Satisfactory results are generally obtained in test animals at doses between 0.5 and 10 mg/kg of body weight. For larger mammals the daily dose amounts to between about 3 and 10 mg. For oral administration the partial doses contain between about 1 and 25 mg of the acid addition salts of the compounds of formula I aside from solid or liquid carrier materials.

Still further, the compounds exhibit an anorexigenic effect as shown by feed consumption tests in rats. Satisfactory results are generally obtained in test animals at doses between 3 and 30 mg/kg of body weight. For larger mammals the daily dose amounts to between about 10 and 50 mg. For oral administration the partial doses contain about 3 to 25 mg of the acid addition salts of the compounds of formula I aside from solid or liquid carrier materials.

It is to be appreciated that precise doses depend on the activity of a particular compound, the mode of administration and particular condition to be treated. It is however to be observed that daily doses are generally administered in divided portions 2 to 3 times a day or in sustained release form.

Physiologically tolerable acid addition salts of the compounds of formula I may be used as medicaments on their own or in the form of appropriate medicinal preparations with conventional pharmacologically inert adjuvants.

Insofar as the production of the required starting materials is not described, these are known or may be produced in accordance with processes known per se or in a manner analogous to the processes described herein or to processes known per se.

In the following non-limitative Examples all temperatures are indicated in degrees Centigrade and are uncorrected.

EXAMPLE 1:

1,3,4,9b-tetrahydro-2(2H)-indeno[1,2-c]pyridine propionic acid methyl ester hydrochloride.

Ten g of 1,3,4,4a,5,9b-hexahydro-5-hydroxy-2(2H)-indeno-[1,2-c]pyridine propionic acid methyl ester are heated to the boil in 100 cc of methanol for 2 hours while passing hydrogen chloride through the solution. The solution is concentrated by evaporation in a vacuum and the residue is recrystallized from acetone/ether and then twice from methanol. The title compound has a M.P. of 183°–185° (decomp.).

The following compound of formula I may be obtained in a manner analogous to that described in Example 1 (Example 2):

| Ex. | $R_1$ | $R_2$ | $R_3$ | $R_4$ | n | phys.chem.constants |
|---|---|---|---|---|---|---|
| 2 | H | COO·C$_2$H$_5$ | H | H | 0 | M.P. of the hydrochloride 176°–178° (decomp.) |

EXAMPLE 3:

1,3,4,9b-tetrahydro-2(2H)-indeno[1,2-c]pyridine propionamide hydrochloride.

Ten cc of thionyl chloride are added dropwise to a solution of 17.9 g of 1,3,4,4a,5,9b-hexahydro-5-hydroxy-2(2H)-indeno[1,2-c]-pyridine propionamide in 350 cc of chloroform. The mixture is boiled at reflux for 30 minutes, whereby the initially resulting resin is dissolved, the solution is concentrated by evaporation in a vacuum and the residue is boiled with 150 cc of isopropanol. After cooling the title compound is filtered off and recrystallized twice from methanol. M.P. 224°–226° (decomp.).

EXAMPLE 4:

1,3,4,9b-tetrahydro-2(2H)-indeno[1,2-c]pyridine propionic acid hydrochloride.

Ten g of 1,3,4,4a,5,9b-hexahydro-5-hydroxy-2(2H)-indeno-[1,2-c]pyridine propionic acid are boiled at reflux for 15 minutes with 100 cc of 2 N hydrochloric acid. The mixture is allowed to cool, the title compound is filtered off and recrystallized from water. M.P. 285°–287° (decomp.).

EXAMPLE 5:

1,3,4,9b-tetrahydro-2(2H)-indeno[1,2-c]pyridine propionitrile hydrochloride.

Ten g of 1,3,4,4a,5,9b-hexahydro-5-hydroxy-2(2H)-indeno-[1,2-cpyridine propionitrile are boiled at reflux for 15 minutes with 100 cc of 2 N hydrochloric acid. The mixture is concentrated by evaporation in a vacuum, the residue is again evaporated with ethanol and the residue is recrystallized twice from ethanol. The title compound has a M.P. of 297°–300° (decomp.).

EXAMPLE 6:

1,3,4,9b-tetrahydro-N-methyl-2(2H)-indeno[1,2-c]pyridine propionamide hydrochloride.

Twelve g of 1,3,4,4a,5,9b-hexahydro-5-hydroxy-N-methyl-2(2H)-indeno[1,2-c]pyridine propionamide are boiled at reflux for 15 minutes with 120 cc of 2 N hydrochloric acid. The mixture is cooled, is made alkaline with solid sodium carbonate and is shaken out several times with ethyl acetate. The extracts are washed with a saturated sodium chloride solution, are dried over magnesium sulphate and concentrated by evaporation. The residue is dissolved in acetone and the solution is acidified with hydrogen chloride in ether, whereupon the title compound crystallizes after some time. After recrystallization from acetone the compound has a M.P. of 186°–188° (decomp.).

EXAMPLE 7:

1,3,4,9b-tetrahydro-2(2H)-indeno[1,2-c]pyridine propionic acid hydrochloride.

Twenty g of crude 1,3,4,4a,5,9b-hexahydro-5-hydroxy-2(2H)-indeno[1,2-c]pyridine propionic acid methyl ester are boiled at reflux for 20 minutes with 200 cc of 2 N hydrochloric acid. The mixture is allowed to cool, the title compound is filtered off and is recrystallized from water. M.P. 285°–287° (decomp.).

The following compounds of formula I may be obtained in a manner analogous to that described in Example 7 (Examples 8 to 16):

| Ex. | $R_1$ | $R_2$ | $R_3$ $R_4$ | n | Phys.chem.constants |
|---|---|---|---|---|---|
| 8 | H | COOH | H H | 3 | M.P. of the hydrochloride 235°–237° (decomp.) |
| 9 | Chlorine | COOH | H H | 0 | M.P. of the hydrochloride 235°–238° (decomp.) |
| 10 | Methyl | COOH | H H | 0 | M.P. of the hydrochloride 234°–236° (decomp.) |
| 11 | Ethyl | COOH | H H | 0 | M.P. of the hydrochloride 243°–246° (decomp.) |
| 12 | H | COOH | H H | 2 | M.P. of the hydrochloride 185° (decomp.) |
| 13 | H | COOH | H H | 2 | M.P. of the hydrochloride 255°–258° (decomp.) |
| 14 | H | COOH | $CH_3$ H | 1 | M.P. of the hydrochloride 150°–180° (decomp.) |
| 15 | H | COOH | $CH_3$ H | 0 | M.P. of the hydrochloride 190°–192° (decomp.) |
| 16 | H | COOH | H $CH_3$ | 0 | M.P. of the hydrochloride 225°–227° (decomp.) |

For the working up of the reaction mixture in Examples 15 and 16 the resulting solution is evaporated to dryness and the residue recrystallized.

EXAMPLE 17:

1,3,4,9'b-tetrahydro-2(2H)-indeno[1,2-c]pyridine propionic acid methyl ester hydrochloride.

A solution of 9.5 g of 1,3,4,9b-tetrahydro-2(2H)- indeno-[1,2-C]pyridine propionic acid hydrochloride (production see Example 4) in 150 cc of methanol is boiled at reflux for 2 hours while hydrogen chloride is passed through the solution. The solution is then concentrated to about 25 cc and after cooling the title compound is filtered off. After recrystallization from methanol it has a M.P. of 183°–185° (decomp.).

The following compound of formula I may be obtained in a manner analogous to that described in Example 17 (Example 18):

| Ex. | $R_1$ $R_2$ | $R_3$ $R_4$ | n | Phys.chem.constants |
|---|---|---|---|---|
| 18 | H COO·$C_2H_5$ | H H | 0 | M.P. of the hydrochloride 176°–178° (decomp.) |

EXAMPLE 19:

1,3,4,9b-tetrahydro-2(2H)-indeno[1,2-c]pyridine propionic acid methyl ester hydrochloride.

The title compound may be obtained in a manner analogous to that described in Example 17, except that 1,3,4,4a,5,9b-hexahydro-5-hydroxy-2(2H)-indeno[1,2-c]pyridine propionic acid is used in place of 1,3,4,9b-tetrahydro-2(2H)-indeno[1,2-c]pyridine propionic acid hydrochloride. The hydrochloride has a M.P. of 183°–185° (decomp.).

EXAMPLE 20:

1,3,4,9b-tetrahydro-2(2H)-indeno[1,2-c]pyridine propionic acid hydrochloride.

The title compound may be obtained by boiling 1,3,4,4a,5,9b-hexahydro-5-hydroxy-2(2H)-indeno[1,2-c]pyridine propionitrile or 1,3,4,9b-tetrahydro-2(2H)-indeno[1,2-c]pyridine propionitrile hydrochloride (production see Example 5) with 2 N hydrochloric acid for 2½ hours and working up the reaction mixture in a manner analogous to that described in Example 7. The hydrochloride has a M.P. of 285°–287° (decomp.).

The following compounds of formula I may be obtained in a manner analogous to that described in Example 1, using the corresponding 1,3,4,4a,5,9b-hexahydro-5-hydroxy-2(2H)-indeno-[1,2-c]pyridine nitriles as starting materials (Examples 21 to 23):

| Ex. | $R_1$ | $R_2$ | $R_3$ $R_4$ | n | Phys.chem.constants |
|---|---|---|---|---|---|
| 21 | H | COOH | H H | 1 | M.P. of the hydrochloride 255°–258° (decomp.) |
| 22 | H | COOH | Methyl H | 0 | M.P. of the hydrochloride 190°–192° (decomp.) |
| 23 | H | COOH | H Methyl | 0 | M.P. of the hydrochloride 225°–227° (decomp.) |

EXAMPLE 24:

1,3,4,9b-tetrahydro-2(2H)-indeno[1,2-c]pyridine propionic acid hydrochloride.

The title compound may be obtained in a manner analogous to that described in Example 20, using 1,3,4,4a,5,9b-hexahydro-5-hydroxy-2(2H)-indeno[1,2-c]pyridine propionamide or 1,3,4,9b-tetra-hydro-2(2H)-indeno[1,2-c]pyridine propionamide hydrochloride as starting material. The hydrochloride has a M.P. of 285°–287° (decomp.).

The compounds required as starting materials may be obtained as follows:

EXAMPLE 25:

1,3,4,4a,5,9b-hexahydro-5-hydroxy-2(2H)-indeno[1,2-c]-pyridine propionic acid methyl ester (for Examples 1 and 7)

Forty g of 1,3,4,4a,5,9b-hexahydro-5(2H)-indeno[1,2-c]-pyridinol, 36 g of acrylic acid methyl ester and 400 cc of methanol are boiled at reflux for 16 hours. The mixture is then concentrated by evaporation in a vacuum, the residue is dissolved in ether and the solution is shaken out thrice with a sodium carbonate solution. After drying over magnesium sulphate the ether phase is concentrated by evaporation. The resulting residue is crude 1,3,4,4a,5,9b-hexahydro-5-hydroxy-2(2H)-indeno[1,2-c]pyridine propionic acid methyl ester in the form of a brown-colored oil. It is sufficiently pure for working up further.

The following compounds of formula II may be obtained in a manner analogous to that described in Example 25 (Examples 26 to 37):

| Ex. | $R_1$ | $R_2$ | $R_3$ $R_4$ | n | Phys.chem.constants | for Ex. |
|---|---|---|---|---|---|---|
| 26 | H | COOH | H H | 0 | M.P. 215°–218° (decomp.) | 4 and 19 |
| 27 | H | CO·NH·$CH_3$ | H H | 0 | M.P. 127°–129° (decomp.) | 6 |
| 28 | H | CN | H H | 0 | M.P. 84°–86° (decomp.) | 5 and 20 |
| 29 | H | COO·$C_2H_5$ | H H | 0 | Further worked up without purification | 2 |
| 30 | H | CO·$NH_2$ | H H | 0 | M.P. 146°–148° (decomp.) | 3 and 24 |
| 31 | Cl | COO·$CH_3$ | H H | 0 | Further worked up without purification | 9 |
| 32 | $CH_3$ | COO·$CH_3$ | H H | 0 | Further worked up without purification | 10 |
| 33 | $C_2H_5$ | COO·$CH_3$ | H H | 0 | Further worked up without purification | 11 |
| 34 | H | COO·$C_2H_5$ | $CH_3$ H | 0 | Further worked up without purification | 15 |
| 35 | H | COO·$C_2H_5$ | H $CH_3$ | 0 | Further worked up without purification | 16 |
| 36 | H | CN | $CH_3$ H | 0 | Further worked up without purification | 22 |
| 37 | H | CN | H $CH_3$ | 0 | Further worked up without purification | 23 |

EXAMPLE 38:

1,3,4,4a,5,9b-hexahydro-5-hydroxy-2(2H)-indeno[1,2-c]-pyridine caproic acid methyl ester (for Example 8)

16.8 g of sodium carbonate are added to a solution of 15 g of 1,3,4,4a,5,9b-hexahydro-5(2H)-indeno[1,2-c]pyridinol in 290 cc of dimethyl formamide, a solution of 16.6 g of 6-bromocaproic acid methyl ester is then added dropwise and the mixture is subsequently heated to 130° for 2 hours. The reaction mixture is cooled, is poured on 1,000 cc of ice water, is extracted thrice with methylene chloride, the combined extracts are dried over magnesium sulphate and concentrated by evaporation. The residue is recrystallized twice from isopropanol/pentane. 1,3,4,4a,5,9b-hexahydro-5-hydroxy-2(2H)-indeno-[1,2-c]pyridine caproic acid methyl ester has a M.P. of 84°–86°.

The following compounds of formula II may be obtained in a manner analogous to that described in Example 38 (Examples 39 to 42):

| Ex. | $R_1$ | $R_2$ | $R_3$ | $R_4$ | n | Phys.chem.constants | for Ex. |
|---|---|---|---|---|---|---|---|
| 39 | H | COO·$C_2H_5$ | $CH_3$ | H | 1 | Further worked up without purification | 14 |
| 40 | H | COO·$C_2H_5$ | H | H | 2 | Further worked up without purification | 12 |
| 41 | H | COO·$C_2H_5$ | H | H | 1 | Further worked up without purification | 13 |
| 42 | H | CN | H | H | 1 | Further worked up without purification | 21 |

EXAMPLE 43:

7-chloro-1,3,4,4a,5,9b-hexahydro-5(2H)-indeno[1,2-c]-pyridinol (for Example 31)

23.5 g of acetic anhydride are added dropwise to a solution of 40 g of 7-chloro-1,3,4,4a,5,9b-hexahydro-2-methyl-5(2H)-indeno[1,2-c]pyridinol in 200 cc of pyridine, and the solution is allowed to stand at room temperature for 15 hours. The solution is then concentrated by evaporation in a vacuum, the residue is taken up in water and extracted thrice with methylene chloride. After drying over magnesium sulphate the solution is concentrated by evaporation and the resulting crude, resinous 5-acetoxy-7-chloro-1,3,4,4a,5,9b-hexahydro-2-methyl-2H-indeno[1,2-c]pyridine is dissolved in 300 cc of benzene. Seventy g of chloroformic acid ethyl ester are added dropwise to this solution while stirring, the solution is subsequently boiled at reflux for 3 hours, a small amount of precipitate is then filtered off, the filtrate is shaken out first with water, then with N hydrochloric acid and finally with a saturated sodium chloride solution, the benzene layer is dried over magnesium sulphate and concentrated by evaporation. The resulting 5-acetoxy-2-ethoxycarbonyl-7-chloro-1,3,4,4a,5,9b-hexahydro-2H-indeno[1,2-c]pyridine is a viscous oil which slowly crystallizes upon standing.

Thirty-five g of 5-acetoxy-2-ethoxycarbonyl-7-chloro-1,3,4,4a,5,9b-hexahydro-2H-indeno[1,2-c]pyridine are boiled at reflux for 9 hours with a solution of 35 g of potassium hydroxide in 350 cc of butanol. After cooling the mixture is poured on 500 cc of a saturated sodium chloride solution and is shaken out thrice with chloroform. After drying over magnesium sulphate the reaction mixture is concentrated by evaporation and the resulting 7-chloro-1,3,4,4a,5,9b-hexahydro-5(2H)-indeno[1,2-c]pyridinol is recrystallized from isopropanol. M.P. 197°–199°.

The following compounds of formula III may be obtained in a manner analogous to that described in Example 43 (Examples 44 and 45):

| Ex. | $R_1$ | Phys.chem.constants | for Ex. |
|---|---|---|---|
| 44 | Methyl | M.P. 168°–170° | 32 |
| 45 | Ethyl | M.P. (isomer A) 128°–130° | 33 |

What is claimed is:

1. A pharmaceutically acceptable acid addition salt of an indenopyridine derivative of the formula:

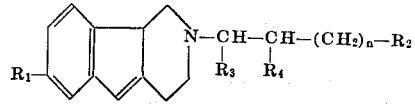

wherein $R_1$ is hydrogen, lower alkyl, fluorine, bromine or chlorine, $R_2$ is cyano, $COOR_5$ wherein $R_5$ is hydrogen or lower alkyl, or

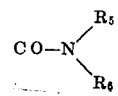

wherein $R_5$ is as above and $R_6$ is hydrogen or lower alkyl, $R_3$ and $R_4$ are hydrogen or lower alkyl, and $n$ is 0 to 3.

2. The compound of claim 1, which is an acid addition salt of 1,3,4,9b-tetrahydro-2(2H)-indeno[1,2-c]pyridine propionic acid methyl ester.

3. The compound of claim 1, which is an acid addition salt of 1,3,4,9b-tetrahydro-2(2H)-indeno[1,2-c]pyridine propionic acid.

4. The compound of claim 1, which is an acid addition salt of 1,3,4,9b-tetrahydro-2(2H)-indeno[1,2-c]pyridine propionamide.

5. The compound of claim 1, which is an acid addition salt of 1,3,4,9b-tetrahydro-N-methyl-2(2H)-indeno[1,2-c]pyridine propionamide.

6. The compound of claim 1, which is an acid addition salt of 1,3,4,9b-tetrahydro-2(2H)-indeno[1,2-c]pyridine propionic acid ethyl ester.

7. The compound of claim 1, which is an acid addition salt of 1,3,4,9b-tetrahydro-2(2H)-indeno[1,2-c]pyridine propionitrile.

8. The compound of claim 1, which is an acid addition salt of 1,3,4,9b-tetrahydro-2(2H)-indeno[1,2-c]pyridine butyric acid.

9. The compound of claim 1, which is an acid addition salt of 3-(1,3,4,9b-tetrahydro-2H-indento[1,2-c]pyridin-2-yl)-butyric acid.

10. The compound of claim 1, which is an acid addition salt of 3-(1,3,4,9b-tetrahydro-2H-indeno[1,2-c]pyridin-2-yl)-2-methyl propionic acid.

11. The compound of claim 1, which is an acid addition salt of 4-(1,3,4,9b-tetrahydro-2H-indento[1,2-c]pyridin-2-yl)-valerianic acid.

12. The compound of claim 1, which is an acid addition salt of 1,3,4,9b-tetrahydro-2(2H)-indeno[1,2-c]pyridine valerianic acid.

13. The compound of claim 1, which is an acid addition salt of 1,3,4,9b-tetrahydro-2(2H)-indeno[1,2-c]pyridine caproic acid.

14. The compound of claim 1, which is an acid addition salt of 7-chloro-1,3,4,9b-tetrahydro-2(2H)-indeno[1,2-c]pyridine propionic acid.

15. The compound of claim 1, which is an acid addition salt of 7-methyl-1,3,4,9b-tetrahydro-2(2H)-indeno[1,2-c]pyridine propionic acid.

16. The compound of claim 1, which is an acid addition salt of 7-ethyl-1,3,4,9b-tetrahydro-2(2H)-indeno[1,2-c]pyridine propionic acid.

* * * * *